(12) United States Patent
Saeki

(10) Patent No.: US 8,646,499 B2
(45) Date of Patent: Feb. 11, 2014

(54) PNEUMATIC TIRE AND MANUFACTURING PROCESS THEREOF

(75) Inventor: Kentaro Saeki, Tokyo (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 1490 days.

(21) Appl. No.: 11/659,477

(22) PCT Filed: Jul. 5, 2005

(86) PCT No.: PCT/JP2005/012385
§ 371 (c)(1),
(2), (4) Date: Feb. 6, 2007

(87) PCT Pub. No.: WO2006/013694
PCT Pub. Date: Feb. 9, 2006

(65) Prior Publication Data
US 2009/0223613 A1 Sep. 10, 2009

(30) Foreign Application Priority Data
Aug. 6, 2004 (JP) .................................. 2004-231119

(51) Int. Cl.
*B29C 33/42* (2006.01)
*B29D 30/52* (2006.01)
*B60C 11/12* (2006.01)

(52) U.S. Cl.
USPC ........... 152/209.21; 152/209.23; 152/DIG. 3; 156/110.1; 264/326; 425/28.1

(58) Field of Classification Search
USPC ........... 152/209.21, 209.23, DIG. 3; 264/326; 156/110.1; 425/28.1
See application file for complete search history.

(56) References Cited

U.S. PATENT DOCUMENTS

| 5,095,963 A | * | 3/1992 | Maitre | 152/DIG. 3 |
| 6,427,737 B1 | * | 8/2002 | Katayama | 152/DIG. 3 |
| 2002/0053383 A1 | * | 5/2002 | Kleinhoff et al. | 152/209.18 |
| 2003/0029537 A1 | * | 2/2003 | Iwamura | 152/209.18 |

FOREIGN PATENT DOCUMENTS

| AU | 8544455 | * | 1/1986 |
| EP | 0 450 251 A1 | | 10/1991 |
| EP | 890457 | * | 1/1999 |
| JP | 8-258515 A | | 10/1996 |

(Continued)

OTHER PUBLICATIONS

Machine translation for Japan 2004-262285 (no date).*

(Continued)

*Primary Examiner* — Steven D Maki
(74) *Attorney, Agent, or Firm* — Sughrue Mion, PLLC

(57) ABSTRACT

A pneumatic tire is molded by using a vulcanizing mold in which blades 20, each composed of a metal thin plate having an inclined portion 20a in the depth direction and a plurality of through holes 20G with the same sectional form as that of projections to be formed in the sipe in the inclined portion 20a are buried in a groove portion corresponding to the tire block of the vulcanizing mold, thereby forming 3D sipes having unevenness in the radial direction of the block and a plurality of pairs of projections in the inclined portion in the block of the tire. Thereby, when longitudinal force is applied to the tire, adjacent small blocks of the block come into close contact with each other only at the positions of the projections of the 3D sipes, thereby making it possible to ensure the block stiffness of the pneumatic tire 10 without reducing the drainage function.

5 Claims, 9 Drawing Sheets

(56) References Cited

FOREIGN PATENT DOCUMENTS

| | | | |
|---|---|---|---|
| JP | 10-86612 A | | 4/1998 |
| JP | 11-105512 | * | 4/1999 |
| JP | 11-348510 | * | 12/1999 |
| JP | 2000-177330 A | | 6/2000 |
| JP | 2001-071330 | * | 3/2001 |
| JP | 2001-130227 A | | 5/2001 |
| JP | 2002-192916 A | | 7/2002 |
| JP | 2002-321509 A | | 11/2002 |
| JP | 2004-262285 | * | 9/2004 |
| JP | 2005-132236 A | | 5/2005 |

OTHER PUBLICATIONS

Machine translation for Japan 11-105512 (no date).*

* cited by examiner

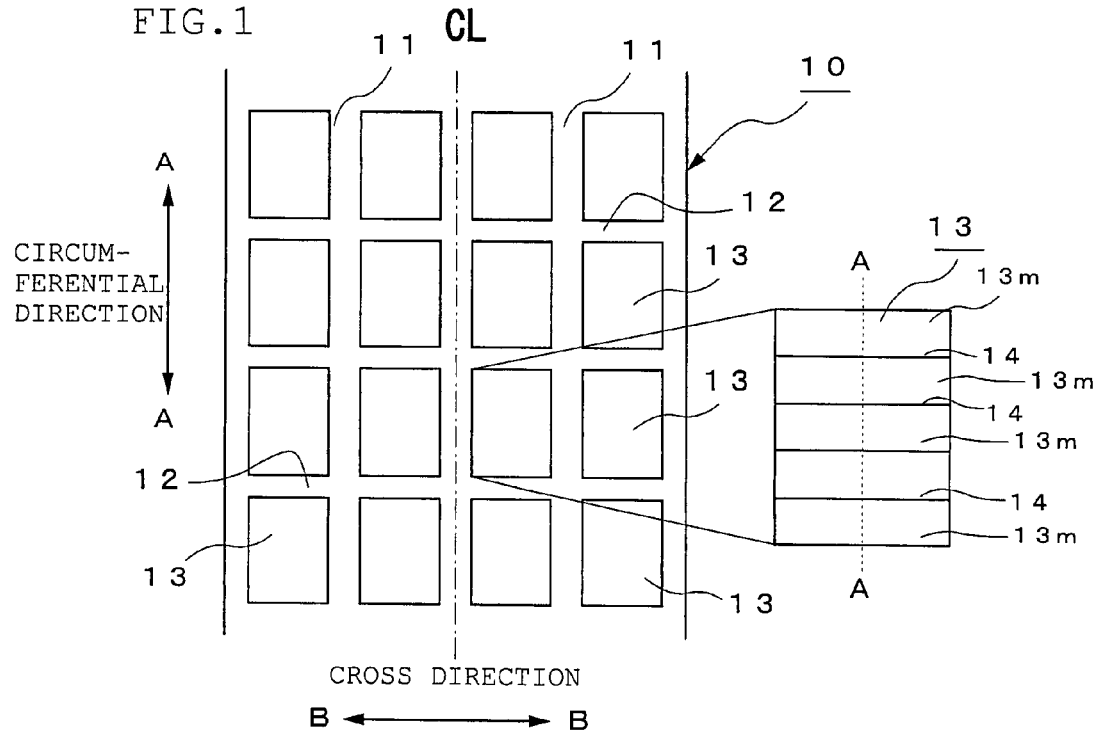
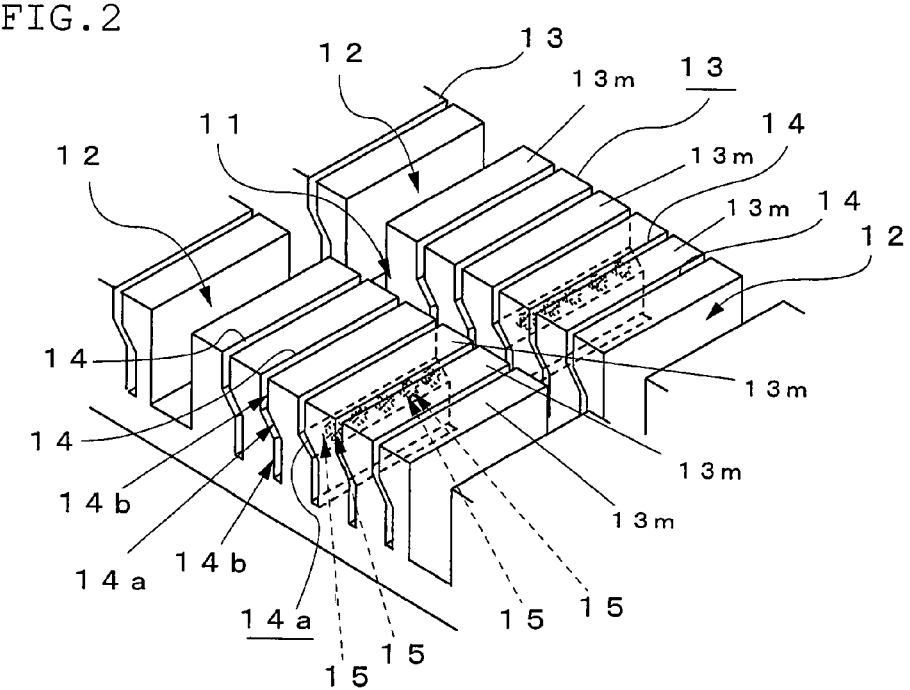

2D SIPE

3D SIPE A

3D SIPE B

3D SIPE C

FIG.7(a)
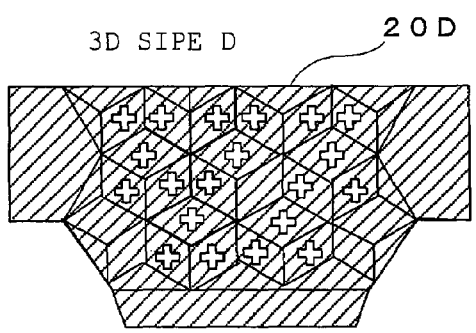
FIG.7(b)
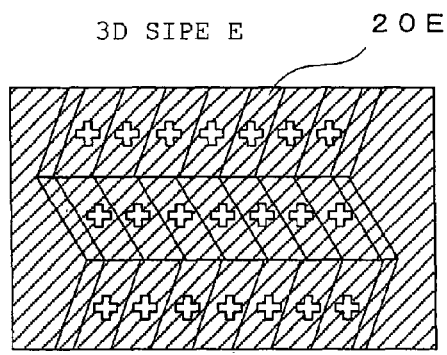
FIG.7(c)
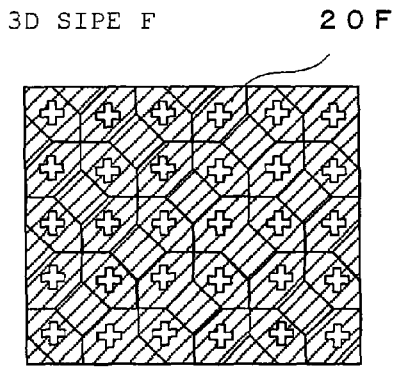
FIG.7(d)
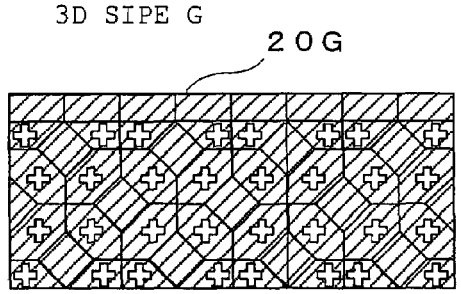
FIG.8
|  | NO HOLE | HOLE A ○ | HOLE B □ | HOLE C ✖ |
|---|---|---|---|---|
| 2D SIPE | 100 | 100 | 100 | 101 |
| 3D SIPE A | 100 | 107 | 108 | 107 |
| 3D SIPE B | 99 | 112 | 112 | 112 |
| 3D SIPE C | 100 | 106 | 107 | 107 |
| 3D SIPE D | 100 | 110 | 112 | 111 |
| 3D SIPE E | 99 | 110 | 112 | 111 |
| 3D SIPE F | 101 | 112 | 112 | 112 |
| 3D SIPE G | 100 | 113 | 114 | 111 |

2D SIPE

3D SIPE A

3D SIPE B

3D SIPE C

3D SIPE D

3D SIPE E

3D SIPE F

3D SIPE G

PNEUMATIC TIRE AND MANUFACTURING PROCESS THEREOF

BACKGROUND OF THE INVENTION

1. Field of the Invention

The present invention relates to a pneumatic tire having blocks on the tread surface and a manufacturing process thereof. Specifically, it relates to a pneumatic tire which is excellent in running performance on an iced road.

2. Description of the Prior Art

In general, a car tire having sipes 14Z which communicate with the vertical groove 11 sides of blocks 13Z at both ends as shown in FIG. 9 and are formed on the surface of a block pattern formed on the tire tread surface to improve the gripping performance of a tire when a vehicle runs on an iced road is widely used. The above sipes 14Z increase the ground contact pressure of the tire due to an edge effect like the edges of the vertical grooves 11 or horizontal grooves 12, and each of the blocks 13Z is divided into a plurality of small blocks 13k by the above sipes 14z on the tire tread side, whereby the block 13Z is easily deformed. The above sipes 14Z cut a water film and form water channels to facilitate drainage when the water film is thick. Therefore, friction force between the road and the tire becomes large, the gripping performance of the tire 10 improves, and the running performance on an iced road of a vehicle enhances.

As for the shape of the above sipe 14Z, a flat (or wavy) sipe whose shape does not change in the depth direction, called "2D sipe" as shown in FIG. 10 is common in the prior art. However, when the sipe 14Z is the above 2D sipe and the number of sipes is increased to raise the friction coefficient, the stiffness of the whole block 13Z lowers and the above sipe 14Z falls, thereby reducing drainage efficiency and gripping performance.

To cope with this, a method of forming a so-called 3D sipe whose shape changes in the depth direction, such as sipes 14A to 14G shown in FIGS. 11(a) to 11(c), FIGS. 12(a) and 12(b) and FIGS. 13(a) and 13(b) in the block 13Z has recently been proposed. That is, by forming 3D sipes having a linear or wavy surface shape and inclined surfaces in the depth direction (radial direction of the block) of the block 13Z in the block 13Z, when longitudinal force such as braking or traction force is applied to the tire 10, the walls of the inclined surfaces of the 3D sipes come into close contact with each other to prevent the fall of the sipes, thereby making it possible to greatly improve the stiffness of the block.

Describing the above sipes 14A to 14G in detail, the sipe 14A shown in FIG. 11(a) is a 3D sipe having one pair of inclined surfaces in the depth direction of the sipe, the sipe 14B shown in FIG. 11(b) is a 3D sipe having two pairs of inclined surfaces in the depth direction of the sipe, and the sipe 14C shown in FIG. 11(c) is a 3D sipe having a series of projections with an equilaterally triangular section in the depth direction of the sipe.

The sipe 14D shown in FIG. 12(a) is a 3D sipe having a series of projections with a triangular section and a series of recesses with a triangular section in the axial direction of the tire both of which are arranged at a half pitch in the depth direction of the sipe, and the sipe 14E shown in FIG. 12(b) is a 3D sipe whose adjacent uneven walls in the depth direction are inclined inversely in the circumferential direction of the tire. The sipe 14F shown in FIG. 13(a) is a 3D sipe having alternating pyramidal projections and recesses in the tire axial direction and depth direction of the sipe, and the sipe 14G shown in FIG. 13(b) consists of a wavy 2D sipe on the front surface side and a 3D sipe having alternating pyramidal projections and recesses at a position deeper than the 2D sipe (refer to patent documents 1 to 4, for example).

Patent document 1: JP-A 11-310012.
Patent document 2: JP-A 2002-321509
Patent document 3: JP-A 2002-187412
Patent document 4: JP-A 2002-356105

SUMMARY OF THE INVENTION

When a 3D sipe such as the above sipes 14A to 14G is formed in the bock 13Z, the stiffness of the block 13Z greatly improves. However, as the sipe functions as a channel for absorbing a water film on ice and draining to the outside of the ground contact surface, if the walls of the sipe come into close contact with each other, the water channel is closed, thereby providing the opposite effect.

It is an object of the present invention which has been made in view of the above problem of the prior art to provide a pneumatic tire which can ensure the stiffness of the block without reducing its draining function and a manufacturing process thereof.

According to a first aspect of the present invention, there is provided a pneumatic tire having a plurality of blocks defined by circumferential-direction grooves extending substantially in the circumferential direction of the tire and a plurality of transverse grooves intersecting the circumferential-direction grooves all of which are formed in the tread surface, wherein sipes which have at least one pair of inclined surfaces in the depth direction of the block and divide each block are formed on the front side of the block, and pairs of projections projecting from the opposed walls, each pair having a total height equal to the width of the sipe, are formed on the at least one pair of inclined surfaces of the sipe in such a manner that they oppose to each other.

According to a second aspect of the present invention, there is provided a pneumatic tire, wherein at least 4 pairs of projections are formed.

According to a third aspect of the present invention, there is provided a pneumatic tire, wherein the total sectional area of the projections is set to 1.5 to 50% of the total area of the inclined surfaces of the sipe.

According to a fourth aspect of the present invention, there is provided a pneumatic tire, wherein at least one pair of projections are formed on the inclined surfaces.

According to a fifth aspect of the present invention, there is provided a pneumatic tire, wherein the sectional form of the projections is circular, cruciform or polygonal.

According to a sixth aspect of the present invention, there is provided a process of manufacturing a pneumatic tire by using a vulcanizing mold in which a plurality of blades for forming sipes are buried in groove portions corresponding to blocks, wherein each of the blades has at least one inclined surface which inclines in the depth direction of the groove portion and through holes in the at least one inclined surface

EFFECT OF THE INVENTION

According to the present invention, to manufacture a pneumatic tire comprising blocks having 3D sipes on the tire tread surface, a blade having an inclined surface in the depth direction and through holes in at least one inclined surface is used in a groove portion corresponding to the above block of a vulcanizing mold to form a sipe having pairs of projections which project from the opposed walls in such a manner that they oppose to each other and each pair of which has a total height equal to the width of the sipe on at least one pair of inclined surfaces. Thereby, when longitudinal force such as braking or traction force is input, the walls of the sipe come into close contact with each other at the positions of the above projections to suppress the fall of the sipe and portions devoid of the above projections of the walls of the sipe form a water channel for draining water between the tire and the road. Therefore, it is possible to manufacture a pneumatic tire having high block stiffness and excellent drainage performance.

BRIEF DESCRIPTION OF THE DRAWINGS

FIG. 1 is a plan view of the tread surface of a pneumatic tire according to an embodiment of the present invention;

FIG. 2 is a perspective view showing the shape of a cross-direction sipe according to the embodiment of the present invention;

FIGS. 7(a) to 7(d) are plan views of blades for forming a sipe having pairs of projections on the inclined surfaces;

FIG. 8 is a table showing the evaluation results of Examples;

DETAILED DESCRIPTION OF THE PREFERRED EMBODIMENTS

Figure 3A:
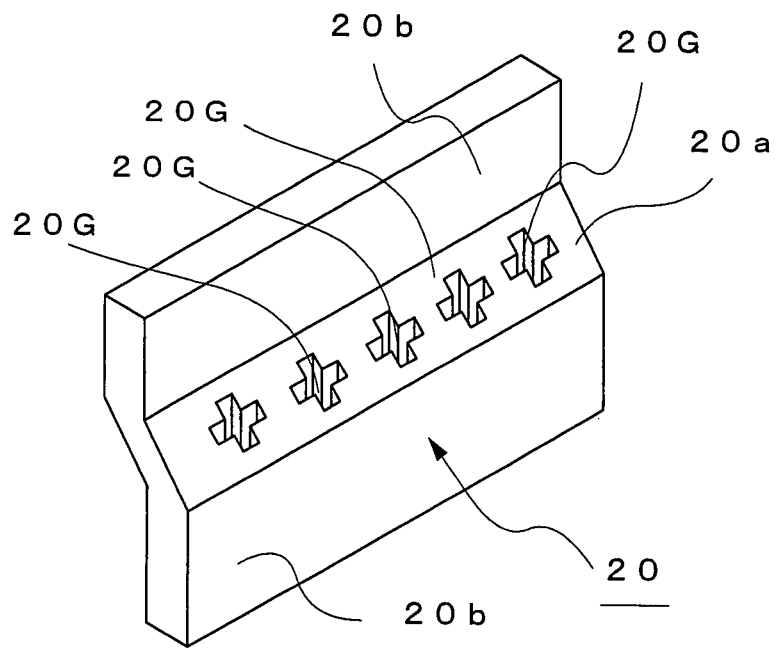
FIGS. 3(a) and 3(b) are diagrams of a blade used to form the cross-direction sipe according to the embodiment of the present invention.

Preferred embodiments of the present invention will be described hereinunder with reference to the accompanying drawings.

FIG. 1 is a plan view of the tread surface of a pneumatic tire 10 according to a preferred embodiment of the present invention. A tread pattern having a plurality of land portions (to be referred to as "blocks" hereinafter) 13 defined by a plurality of circumferential-direction grooves (main grooves or longitudinal grooves) 11 extending in the circumferential direction of the tire shown by an arrow A in FIG. 1 and a plurality of transverse grooves (auxiliary grooves) 12 extending in the cross direction of the tire shown by an arrow B and intersecting the main grooves 11 is formed on the tread surface of the tire 10 in this embodiment. A plurality of cross-direction sipes 14 extending in a direction almost parallel to the above auxiliary grooves 12 and dividing the front side of the block 13 into small blocks 13m are formed in the above block 13.

The cross-direction sipe 14 according to the present invention is a 3D sipe having an inclined portion 14a and linear portions 14b in the depth direction (radial direction of the block 13) as shown in FIG. 2, and pillar-like projections 15 and 15 having a total height equal to the sipe width of the above inclined portion 14a are formed on the respective walls of the above inclined portion 14a in such a manner that they oppose to each other from the walls. In this embodiment, five pairs of projections 15 having a cruciform section are formed at equal intervals in the cross direction of the above inclined portion 14a.

Figure 3B:
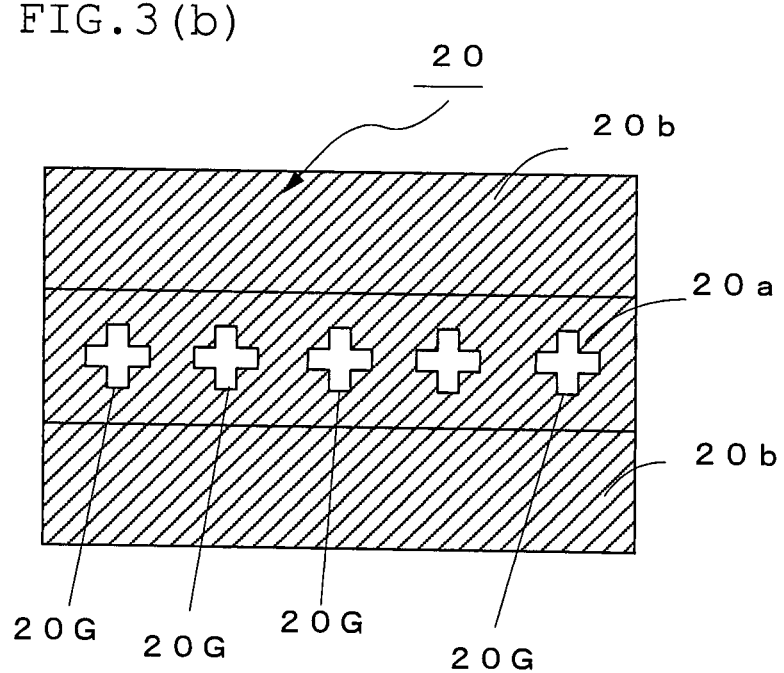

FIGS. 3(a) and 3(b) are perspective and plan views of a blade 20 for forming the above cross-direction sipe 14. This blade 20 has an inclined portion 20a and linear portions 20b and is composed of a metal thin plate having a plurality of through holes 20G with the sectional form (cruciform) of the above projections 15 in the inclined portion 20a at positions corresponding to the above projections 15 of the inclined portion 14a.

When this blade 20 is buried in a groove portion corresponding to the above block 30 of a vulcanizing mold to cure and mold a crude tire, tread rubber enters even the above through holes 20G to form pillar-like projections for interconnecting the walls of the above inclined portion 14a. Since the pillar-like projections are cut by the above blade 20 after curing, a 3D sipe 14 having a plurality of pairs of projections (15, 15) which are arranged at equal intervals in the cross direction of the inclined portion 14a and project from the opposed walls of the above inclined portion 14a in such a manner that they oppose to each other and each pair of which has a total height equal to the sipe width of the inclined portion 14a as shown in FIG. 2 can be formed in the block 13 of the tire tread.

The plurality of pairs of pillar-like projections 15 and 15 projecting from the above walls are formed on the walls of the inclined portion 14a of the above sipe 14 in such a manner that they oppose to each other. Therefore, when longitudinal force such as braking or traction force is applied to the above pneumatic tire, adjacent small blocks 13m and 13m divided by the above sipe 14 are supported to each other through the above pillar-like projections 15 and 15, thereby making it possible to improve the stiffness of the block 13. Since portions other than the above projections 15 and 15 of the walls of the above sipe 14 do not come into close contact with each other, the portions devoid of the above projections of the walls of the above sipe 14 form a water channel for draining water between the tire and the road while running on an iced road, thereby making it possible to ensure drainage.

Figure 4A:
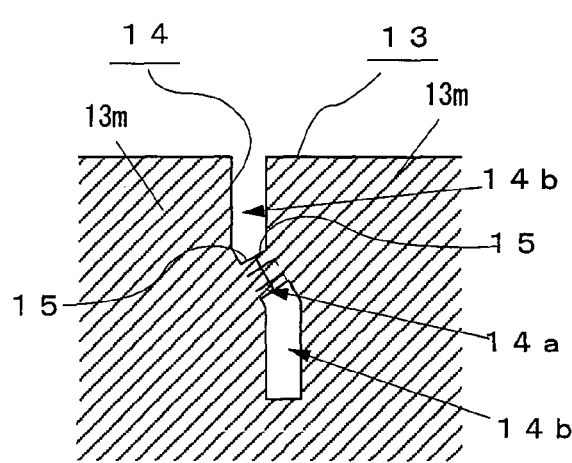
FIGS. 4(a) to 4(c) are diagrams showing the deformation of the tread surface when longitudinal force is applied to the tire having blocks in which the sipes of the present invention are formed.
Figure 4B:
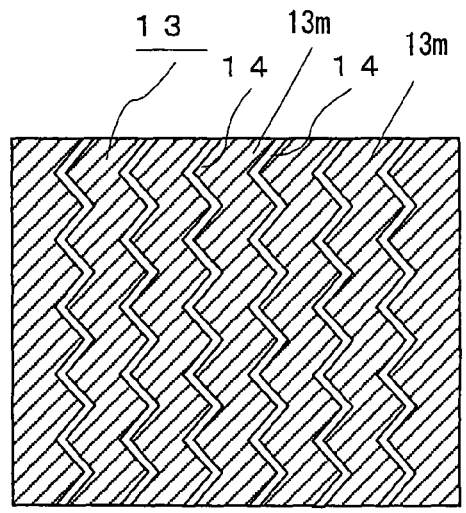
Figure 4C:
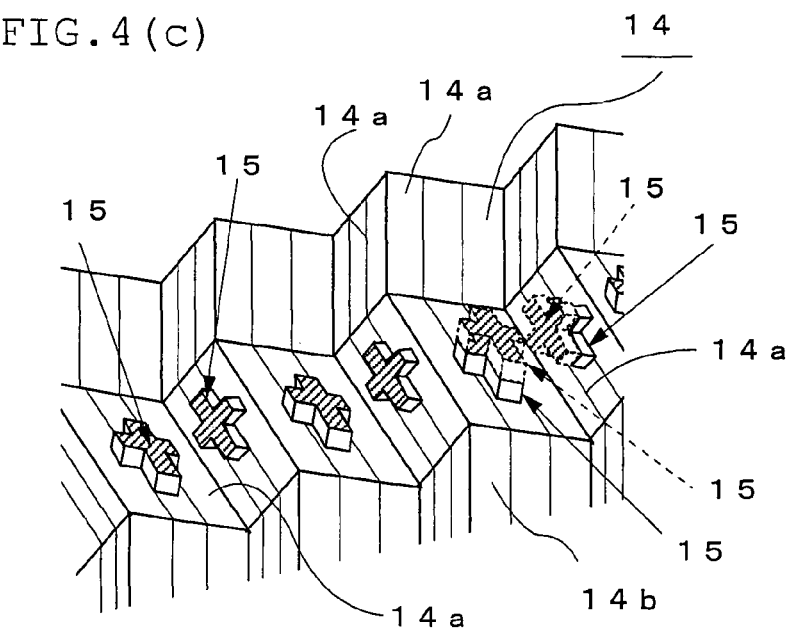

That is, when longitudinal force is applied to the block 13 as shown in FIG. 4(a) while running and the sipe formed in the above block 13 is a 3D sipe like the sipe 14, the opening of the sipe 14 becomes small on the tread surface of the tire as shown in FIG. 4(b). This is because the small blocks 13m and 13m divided by the above sipe 14 come into close contact with each other at positions where the projections 15 and 15 are formed in the inclined portion 14a, thereby improving stiffness. Further, in the block 13 where the sipes 14 of the present invention are formed, the small blocks 13m and 13m come into contact with each other only at positions where the projections 15 and 15 shown by slant lines in the figure are formed as shown in FIG. 4(c). Therefore, the stiffness of the block can be improved and drainage can be ensured.

Figure 5A:
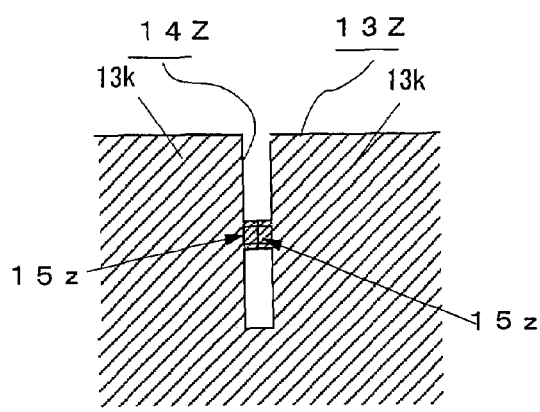
FIGS. 5(a) and 5(b) are diagrams showing the deformation of the tread surface when longitudinal force is applied to the tire having blocks in which the 2D sipes of the prior art are formed.
Figure 5B:
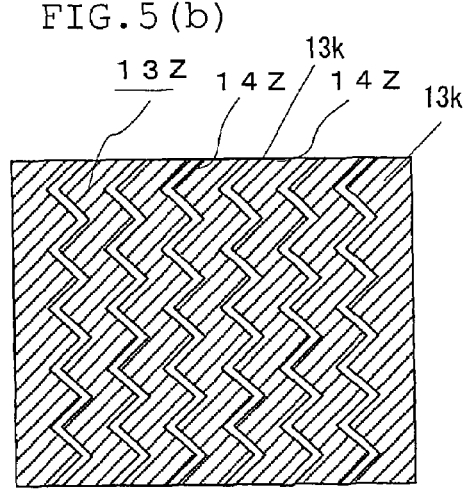
Figure 6A:
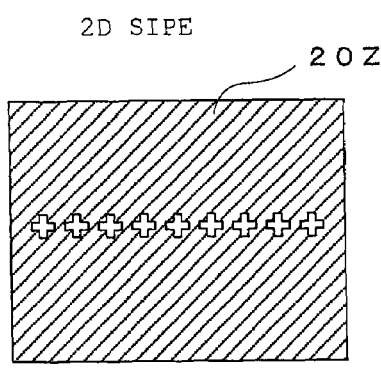
FIGS. 6(a) to 6(d) are plan views of blades for forming a sipe having pairs of projections on the inclined surfaces.
Figure 6B:
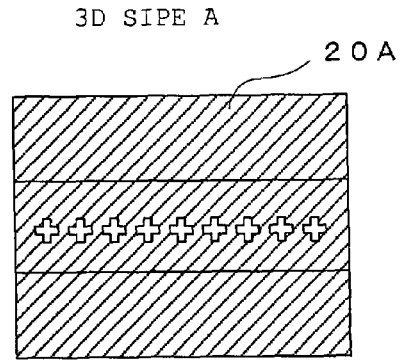
Figure 6C:
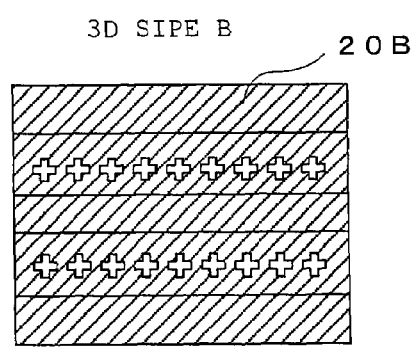
Figure 6D:
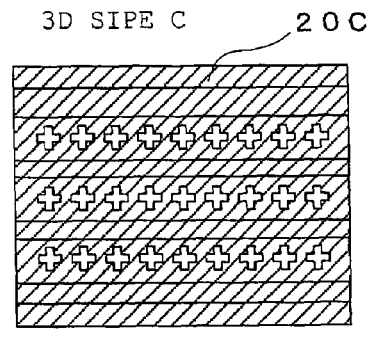
Figure 9:
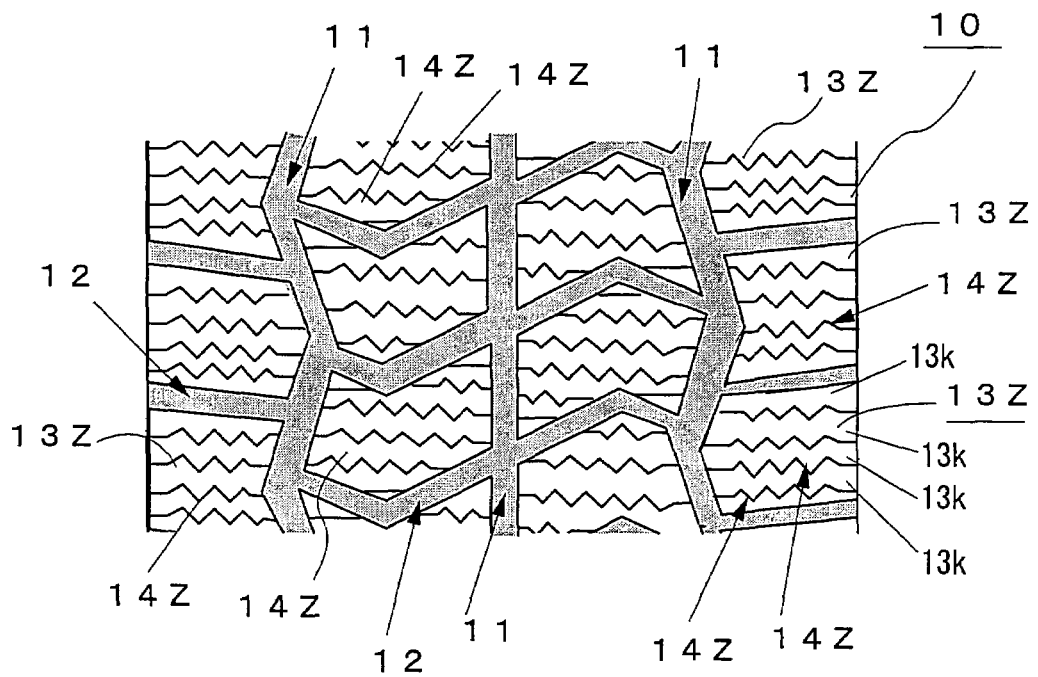
FIG. 9 is a diagram showing the tread pattern of a pneumatic tire.

In contrast to this, when the sipe formed in the block 13Z is a conventional 2D sipe 14Z which is uniform in width in the radial direction of the block 13Z as shown in FIG. 5(a), even if projections 15z and 15z are formed in the above 2D sipe 14Z, the opening of the sipe 14Z becomes large on the tread surface of the tire as shown in FIG. 5(b). This shows that the stiffness of the above block 13Z is lower than the stiffness of the block 13 of this embodiment. This is considered as follows. Since the portion where the above projections 15z and 15z are formed is not inclined in the 2D sipe 14Z, the small blocks 13k and 13k do not come into close contact with each other, whereby the stiffness of the block 13Z does not improve so much even when the projections 15z and 15z are formed.

According to this embodiment, the pneumatic tire 10 is molded by using a vulcanizing mold in which blades 20 each composed of a metal thin plate and having an inclined portion 20a in the depth direction and a plurality of through holes 20G with the same sectional form as that of the projections 15 and 15 to be formed on the sipe 14 in the above inclined portion 20a are buried in a groove portion corresponding to the tire block. Therefore, a pneumatic tire 10 comprising 3D sipes, each having unevenness in the radial direction of the block 13 and a plurality of pairs of projections 15 and 15 which project from the walls in such a manner that they oppose to each other and each pair of which has a total height equal to the sipe width of the inclined portion 14a on the walls of the inclined portion 14a in the block 13 of the tire 10 can be manufactured. When longitudinal force is applied to the above pneumatic tire 10, the small blocks 13m and 13m of the above block 13 come into close contact with each other only at the positions of the above projections 15 and 15, thereby making it possible to ensure the stiffness of the block without reducing the drainage function.

In the above embodiment, the cross-direction sipes 14 having one pair of inclined surfaces in the depth direction are formed in the block 13. The sipe of the present invention is not limited to the above cross-direction sipe 14. It is needless to say that, when a plurality of pairs of projections (opposed projections 15 and 15) are formed on the inclined surfaces of even a sipe having unevenness in the radial direction of the block 13 such as the 3D sipes 14B to 14G shown in FIGS. 11(b) and 11(c), FIGS. 12(a) and 12(b) and FIGS. 13(a) and 13(b), the stiffness of the block can be improved without reducing the drainage function.

The number of pairs of the above projections is not particularly limited. However, to improve the stiffness of the block, it is preferably 4 or more. The total sectional area of the above projections 15 is preferably set to 1.5% to 50% of the total area of the inclined surfaces of the sipe. That is, when the total sectional area of the above projections 15 is smaller than 1.5% of the total area of the inclined surfaces of the sipe, the effect of increasing the stiffness of the block and improving drainage is not obtained and when the total sectional area is larger than 50%, it is difficult to take the tire out from the mold after curing. Therefore, the total sectional area of the above projections 15 is preferably set to 1.5 to 50% of the total area of the inclined surfaces of the sipe.

When there are a plurality of pairs of inclined surfaces, pairs of projections may be formed on a specific pair of inclined surfaces or all of the pairs of inclined surfaces.

In the above embodiment, the sectional form of the projections 15 and 15 is cruciform. It may be circular or polygonal. Further, the shape of the sipe 14 on the surface of the block is not particularly limited and may be linear, zigzag, wavy or a combination thereof.

EXAMPLES

Figure 10:
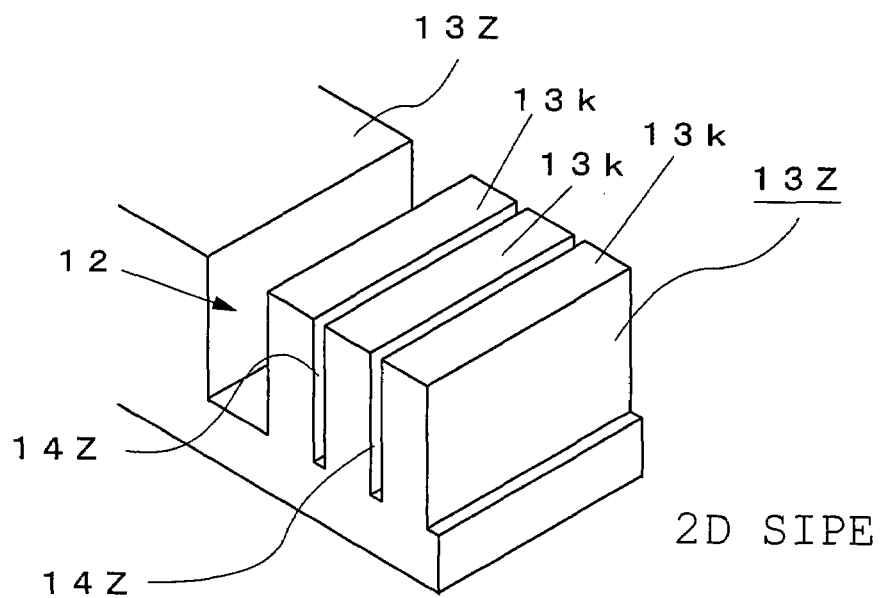
FIG. 10 is a diagram of a 2D sipe of the prior art.
Figure 11A:
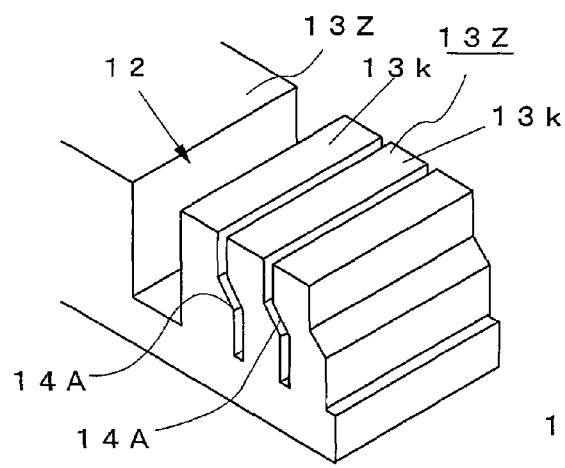
FIGS. 11(a) to 11(c) are diagrams of 3D sipes of the prior art.
Figure 11B:
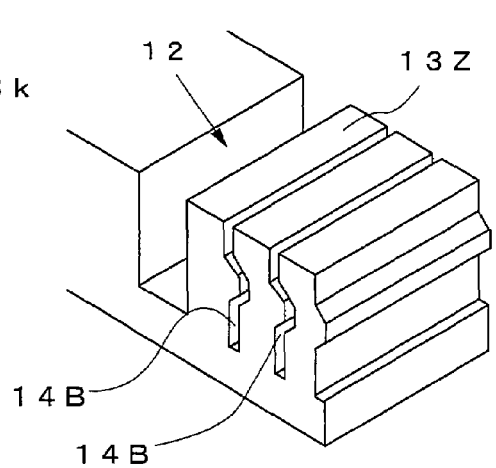
Figure 11C:
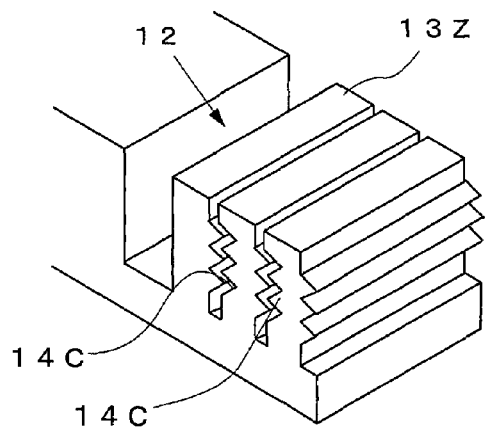
Figure 12A:
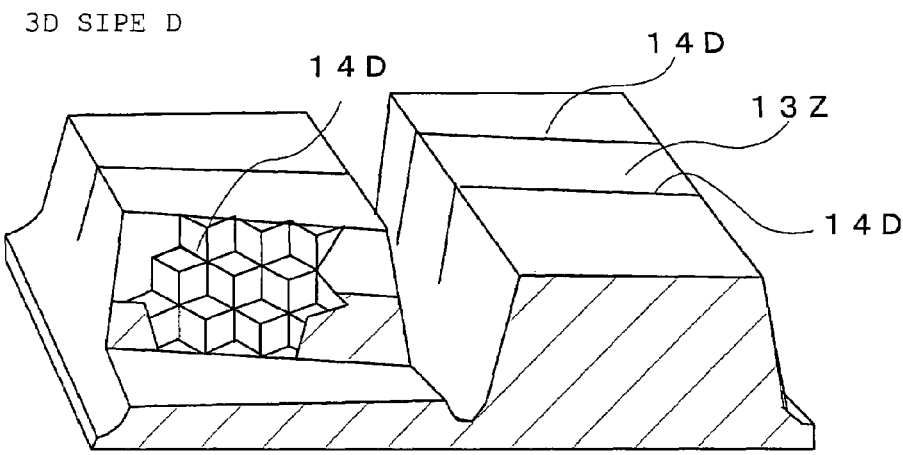
FIGS. 12(a) and 12(b) are diagrams of 3D sipes of the prior art.
Figure 12B:
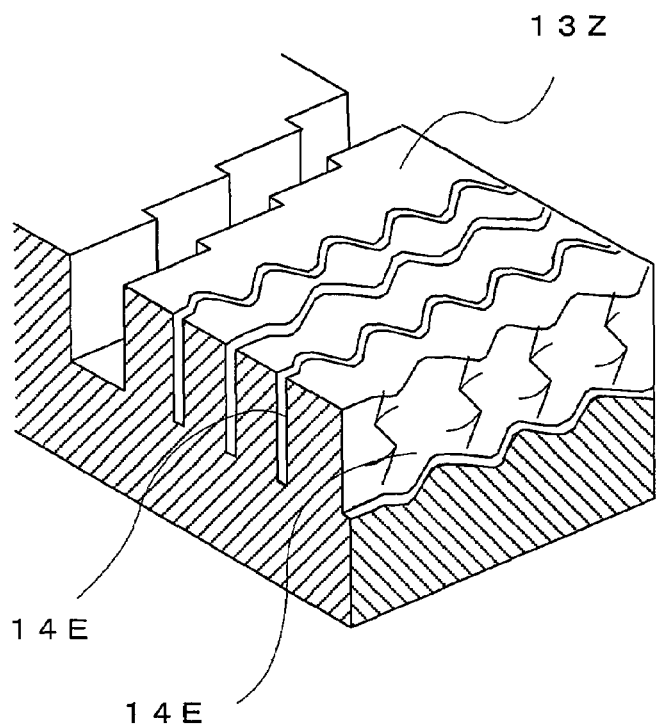
Figure 13A:
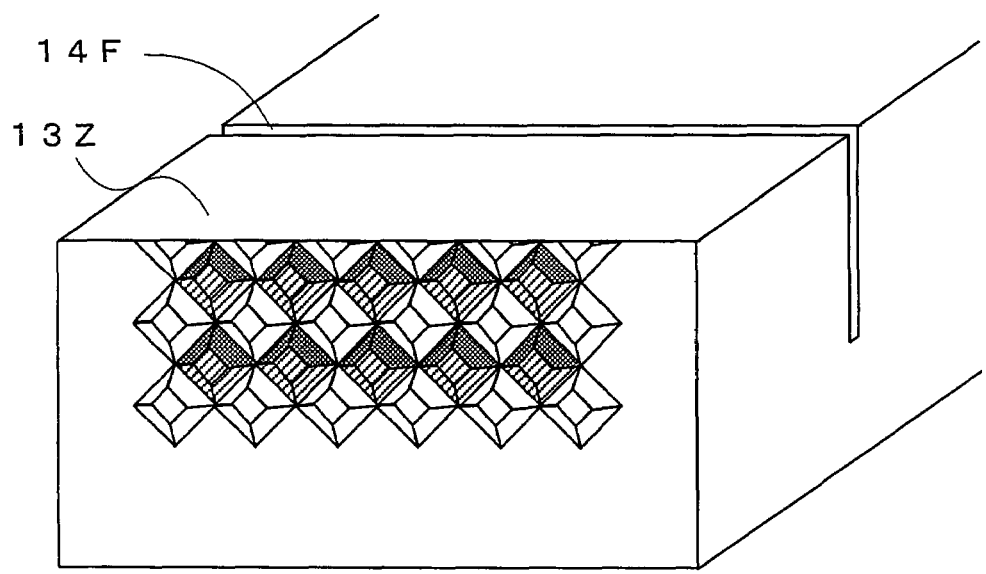
FIGS. 13(a) and 13(b) are diagrams of 3D sipes of the prior art.
Figure 13B:
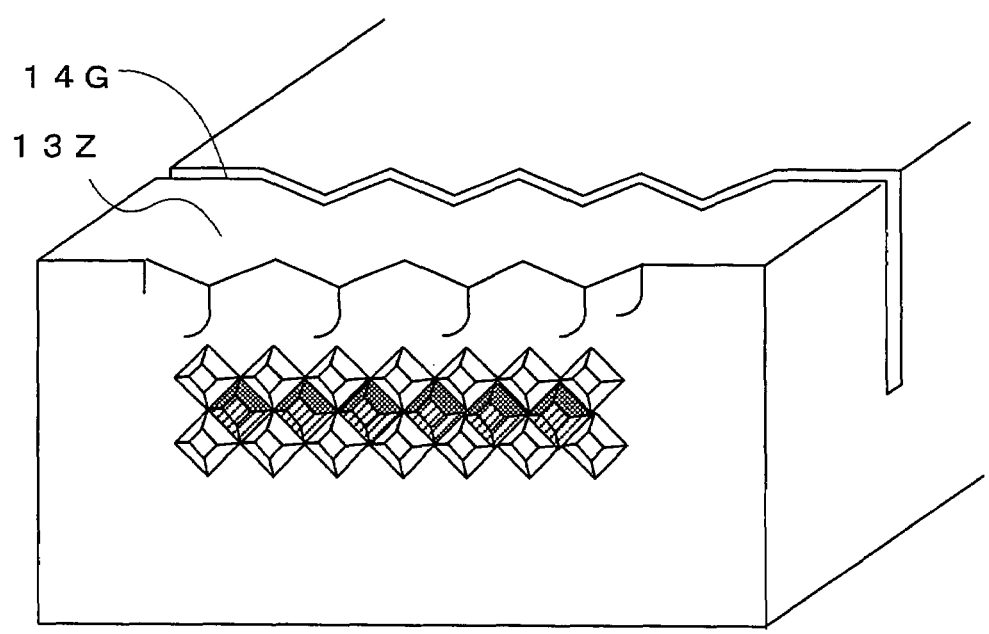

To form pairs of projections on the inclined surfaces of each sipe in 7 different kinds of tires having blocks in which the sipes 14Z (2D type) shown in FIG. 10 and the sipes 14A to 14G (3D sipes A to G) shown in FIGS. 11 to 13 were formed, vulcanizing molds having respective blades 20Z and 20A to 20G with circular, square or cruciform holes A to C in slant line portions shown in FIGS. 6(a) to 6(d) and FIGS. 7(a) to 7(d) were used to mold crude tires which were each mounted to test vehicles to carry out a braking test on an iced road so as to evaluate performance in an icy condition. For comparison, a braking test on an iced road was made on a prior art tire which was molded by using blades without through holes. As for the size of the block of the prior art, it had a length in the circumferential direction of the tire of 25 mm, a length in the cross direction of the tire of 20 mm, a height of 10 mm, a sipe depth in the cross direction of 7 mm and a sipe interval in the cross direction (length of small block) of 5 mm.

The braking test was carried out by starting at an initial speed of 40 km/h and braking to the full to measure a braking distance until the vehicle became completely stationary so as to calculate an average deceleration from the initial speed and the braking distance. As for evaluation, the obtained result is expressed by an index of average deceleration when the average deceleration of the prior art 2D sipe is 100. As the index increases, performance in an icy condition becomes more excellent. The evaluation results are shown in the table of FIG. 8.

The tire size of the above tire was 195/65R15 and the inside pressure was 200 kPa in the actual running test.

As obvious from the table, even when projections were formed in the 2D sipe, performance in an icy condition remained unchanged. When projections were formed in the 3D sipe, the sipes A to G had a larger index of average deceleration than those of sipes without projections. It is thus confirmed that they had improved performance in an icy condition. There was not so much difference according to the shape of the hole.

INDUSTRIAL FEASIBILITY

According to the present invention, since the stiffness of the block can be ensured without reducing the drainage function, a pneumatic tire having excellent performance in an icy condition can be manufactured and the running performance of a vehicle can be improved.

What is claimed is:

1. A pneumatic tire comprising:
   a plurality of blocks defined by circumferential-direction grooves extending substantially in the circumferential direction of the tire;
   a plurality of transverse grooves intersecting the circumferential-direction grooves, where the circumferential-direction grooves and the transverse grooves are all formed in a tread surface; and
   a plurality of sipes which have at least one pair of inclined surfaces in the depth direction of the block and divide each block are formed on a front side of the block, the inclined surfaces being inclined with respect to the depth direction, only the inclined surfaces of the plurality of sipes being provided with a plurality of pillar-like projections in the width direction of the inclined surfaces,
   wherein:
   the plurality of sipes are each formed by a single blade comprising a linear portion which is parallel to the depth direction and an inclined portion that is oriented at an angle with respect to the linear portion;
   a respective pillar-like projection of the plurality of pillar-like projections is disposed on each of the inclined surfaces of each sipe and an entire side peripheral surface of the respective pillar-like projection extends in the direction orthogonal to the pair of inclined surfaces, the respective pillar-like projection of each of the inclined surfaces constituting a pair of projections that oppose each other;

each projection of the pair of projections mutually abuts to provide support when a longitudinal force is input to the tread surface so as to secure block stiffness;

a total height of the pair of projections corresponds to a width of the sipe; and a total sectional area of the projections provided on the inclined surfaces of a respective sipe is set to 1.5 to 50% of the total area of the inclined surfaces of the respective sipe.

2. The pneumatic tire according to claim 1, wherein the sectional form of each respective projection is circular, cruciform or polygonal.

3. The pneumatic tire according to claim 1, wherein at least four pairs of projections are formed.

4. A process of manufacturing a pneumatic tire by using a vulcanizing mold comprising:

burying a plurality of blades for forming sipes in groove portions of the vulcanizing mold, each groove portion for forming a block of a tread of the tire, wherein each of the blades has a plate member having a linear portion which is parallel to a depth direction of the groove portion and an inclined portion that has an inclined surface which inclines with respect to the depth direction of the groove portion, wherein each blade is provided with a plurality of holes penetrating in the direction orthogonal to the inclined surface, in the width direction of the inclined surface and all holes of each blade are only provided in the inclined portion, such that only the inclined portion is provided with the plurality of holes, and the total sectional area of the holes provided on each inclined surface is set to 1.5 to 50% of the total area of the inclined portion on which the holes are arranged, providing tread rubber to the vulcanizing mold, such that the tread rubber enters the through holes of each of the blades to form projections interconnecting walls of the sipes formed by each of the blades, and cutting each projection after curing to form a pair of opposing projections out of each projection, wherein an entire side peripheral surface of each of the plurality of holes penetrates in the orthogonal direction to the inclined surface.

5. The process of manufacturing a pneumatic tire by using the vulcanizing mold according to claim 4, wherein at least four pairs of projections are formed.

* * * * *